United States Patent [19]

Bertini et al.

[11] Patent Number: 4,698,171
[45] Date of Patent: Oct. 6, 1987

[54] SYNTHETIC ORGANIC POLYMERS FOR THE SELECTIVE FLOCCULATION OF TITANIUM AND IRON ORES

[75] Inventors: Vincenzo Bertini, Cosenza; Anna Marabini, Frascati; Angela De Munno, Pisa; Maria Barbaro, Rome; Marco Pocci, Surdo Di Rende, all of Italy

[73] Assignee: Consiglio Nazionale Delle Ricerche, Rome, Italy

[21] Appl. No.: 818,305

[22] Filed: Jan. 13, 1986

[51] Int. Cl.⁴ .............................................. C09K 3/00
[52] U.S. Cl. ..................................... 252/60; 252/180; 526/263; 526/268; 526/313
[58] Field of Search .................. 252/60, 180; 526/263, 526/268, 313

[56] References Cited

U.S. PATENT DOCUMENTS

| | | | |
|---|---|---|---|
| 3,156,720 | 11/1964 | Goldberg et al. | 560/221 |
| 3,180,851 | 4/1965 | Goldberg et al. | 526/313 |
| 3,292,780 | 12/1966 | Frommer et al. | 209/5 |
| 3,409,589 | 11/1968 | Kine | 526/265 |
| 3,445,566 | 5/1969 | Skoultchi et al. | 523/105 |

Primary Examiner—Robert A. Wax
Attorney, Agent, or Firm—Pollock, Vande Sande & Priddy

[57] ABSTRACT

Flocculating agents for the selective flocculation of ultrafine granulometry titanium and iron ores suspended in water, said agents being made up of polymeric or copolymeric compounds containing as the monomeric units the monomers of formula I

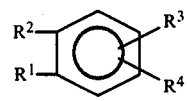

wherein $R^1$ and $R^2$, which can be the same or different, represent a $-O-CHR^5-O-$ bridge, or two hydroxyl groups which can also be in the form of their ether or ester derivatives, and in which formula one of the symbols $R^3$, $R^4$ or $R^5$ corresponds to an atomic group containing, at a position variously spaced from the substitution site, a polymerizable system which is preferably an olefinic system activated with respect to polymerization reactions, whereas the other symbols, which can be the same or different, can be hydrogen atoms or alkyl, aryl, hydroxyl, alkoxyl, hydroxyalkyl, alkoxyalkyl, haloakyl, carbonyl, carboxyl, ester, amido, nitrilo, or sulfonic groups, or halogen atoms or nitro groups.

The copolymerizable comonomers which can be copolymerized with said monomers of formula I are made up of olefinic compounds which are active towards polymerization reactions and contain groups whose hydrophilic character changes with the pH values.

9 Claims, No Drawings

SYNTHETIC ORGANIC POLYMERS FOR THE SELECTIVE FLOCCULATION OF TITANIUM AND IRON ORES

DISCLOSURE OF THE INVENTION

The present invention relates to synthetic organic polymers for the selective flocculation of titanium and iron ores.

More particularly this invention relates to organic polymers and copolymers suitable for causing the selective flocculation of ores of the so-called "ultrafine granulometry" suspended in water, said flocculation occurring with high yields.

It is well known that selective flocculation has been applied quite unfrequently up to the present time for the processing of a limited number of ores because of lack of suitable flocculating compounds. However, flocculating procedures are increasingly attracting attention because of their potential advantages; indeed, such procedures could allow the recovery high amounts of valuable ores dispersed in the form of particles of sizes smaller than 20 μm, a goal impossible or impractical to obtain.

It is to be observed that so fine granulometries relate not only to large number of waste materials from processes carried out with the present day techniques, but also to whole masses of known ore bodies, in which the crude materials have an ultrafine microcomposite structure corresponding to the compenetration of very highly fine particles of different minerals, which masses are to be previously subjected to grinding to very fine sizes in order to be exploited. On the other side, no conventional procedure for treating fines can be employed for granulometries below the limit pointed out above, including the flotation processes, except for the selective flocculation which for instance was successfully employed in the treatment of the mineral taconite ((D. W. Frommer, A. F. Colombo, J. W. Villari and G. A. Dawe, Min. Cong. J. 61, 40 (1975); U.S. Pat. No. 3,292,780, Dec. 20, 1966; Chem. Abstr. 66, 58118y (1967)).

However, the applications of such procedure are strongly limited by the lack of suitable synthetic flocculating agents.

Though at the present time in some cases said agents are obtained empirically by transformation or adaptation of already existing materials obtained or a different use or available because of their vegetal or animal origins, no safe criteria are known for stating their compositions or structures or performances beforehand.

In order to meet the need for the availability of said synthetic selective flocculating agents for titanium and iron ores, it was observed in previous experiments that their functional types can be described on the basis of just three essential parameters:
  chemical functions of interaction with the ore particles,
  chemical hydrophobic and linking functions, and
  chemical relation functions with water as a solvent, having f.i. the hydrophilic character that can be adapted or "modulated" by an external agent. It is useful to remark that a suitable choice of the latest function allows for the preparation of polymeric materials which can be either good flocculating agents or quite poor dispersing agents according to external conditions, such as for instance the pH value. All that gives quite important advantages, such as the reduction to minimal amounts the presence of undesired physically entrained waste materials, or the increase of selectivity through the establishment of more balanced conditions between particle and polymeric compound.

On the basis given above, flocculating agents were surprisingly found which are the object off the present invention and are selective for titanium and iron ores, said flocculating agents consisting of polymeric and copolymeric compounds containing in the form of monomeric units the monomers corresponding to the following general formula I

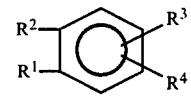

wherein $R^1$ and $R^2$, which can be the same or different from each other, represent a bridging group of the formula —O—$CHR^5$—O—, or they represent two hydroxyl groups which can also be in the form of their ether or ester derivatives, whereas one of the symbols $R^3$, $R^4$ or $R^5$ corresponds to an atomic group containing, at a position variously spaced from the substitution site, a polymerizable system, the other groups, which also can be the same or different from each other, being hydrogen atoms or alkyl, aryl, hydroxyl groups or alkoxyalkyl, hydroxyalkyl, alkoxy, haloalkyl, carbonyl, carboxyl, ester, amido, nitrilo, or sulfonic groups, or halogen atoms or nitro groups. Preferably, said polymerizable system is an olefinic system activated with respect to polymerization reactions.

The monomeric compounds corresponding to the general formula I contain their active parts, acting towards the mineral particles, at various distances from the polymerizable double bond, because the distance from the polymeric chain affects the activity of the compound both in the case the distance is realized with structures containing carbon and hydrogen atoms only, and in the case it is realized with heteroelement-containing structures.

Preferably, said copolymers are made up of monomeric units corresponding to the general formula I and to olefinic monomers, containing groups whose hydrophilic character changes with the value of pH.

Particularly advantageous among said monomers are acrylic acid, methacrylic acid, vinyl benzoic acids, their hydroxyethylesters and aminoethylesters, vinylbenzoic acids, acrylamides, N-vinylacetamides, aminoalkylvinylethers, vinylphenols and their ethers or esters, vinylpyridines, by preference 4-vinylpyridine, vinylpyridine-N-oxides, acryloylmorpholines, vinylmorpholines, vinylpyrroles, vinylpyrazoles, vinylimidazoles, vinylquinolines, N-vinyllactames.

The monomers of the general formula I are prepared with different methods due to the nature of the groups $R^1$, $R^2$, $R^3$, $R^4$ and $R^5$ as well as to the availability of the various reagents on the market. The examples given herein show some of the procedures employed. However, it is also reasonable to expect the possibility of preparing the same easily by other methods, starting from the same reactants or from other ones, simply adapting the general known reactions of organic chemistry to the specific cases in question.

As sometimes the chemical functions contained in the monomers of the general formula I are incompatible with the polymerization initiators or with the polymerization reactions adopted, said monomers are prepared and employed in a chemically protected form, the desired chemical functions being then liberated when the polymeric or the copolymeric compound has been obtained. The copolymers are generally prepared with a low conversion degree of the copolymerization reaction in order to prevent the same from showing wide composition variations, but conversions between 0% and 100% are all possible with no exclusion. The polymeric materials are purified from monomers and oligomers by precipitation from different solvents and they are subjected to fractionation through slow precipitation by addition of a "non-solvent" from diluted solutions kept at a constant temperature, so that samples are obtained whose molecular weights are sufficiently equal for carrying out flocculation tests as functions of the molecular weight.

According to the present invention, the average molecular weight of the flocculating agents of the present invention is variable in the range from several thousands up to one million for not crosslinked materials, but materials of larger molecular weights up to several millions are not excluded. The flocculating power is generally low sensitive to variations in the molecular weight. Copolymers consist of two or more components, for instance of three components, and they preferably contain monomers of the general formula I in amounts between 10 and 30%, but higher amounts of monomers corresponding to formula I cannot be excluded. The flocculating power of a copolymer is generally remarkably dependent on the qualitative and quantitative comonomeric composition of the copolymeric compound itself.

It is to be observed that polymers containing 100% of the monomer corresponding to the general formula I are not excluded from the realm of the present invention.

Moreover, it can be recalled that said polymers and copolymers have saturated hydrocarbon chains deriving from the polymerization of activated olefinic systems. The polymerization and copolymerization reactions are generally carried out, for the sake of simplicity, employing initiators of the radical type, but any other polymerization type which is compatible or can be made compatible through suitable chemical protections with the chemical functions present in the monomers, can also be employed successfully.

Because of the presence of oxygen- or nitrogen-containing functions which show a remarkable acid or basic character, the flocculating agents which are the object of the present invention have a water solubility and a flocculating power which are both remarkably dependent on the pH values. Thus, they are good flocculating agents at a given pH value, whereas they show poor flocculants or very often they show dispersing at the pH values of the opposite character. This feature can also be obtained by selecting properly the comonomers pointed out above, the choice being carried out among the simplest or the commonest of the same which show a hydrophilic character variable with the pH value, so that such agents can be exploited for a more balanced treatment and conditioning of the ore dispersions. The use of the flocculating agent is started with aqueous solutions at the pH values at which the agent itself is more soluble, changing then the pH value till the optimal value for flocculation, said value being determined experimentally for each particular case, through the addition of the mineral acid or of a base while stirring.

Stirring, temperature and conditioning time of the ore dispersions with the solution of the flocculating agent, as well as the concentration of such solution and the density of the ore dispersion, are all determined experimentally for each case, being impossible to be fixed in advance because of the nature of the subject which is essentially empirical; however, shear stress stirring devices are avoided in general in order to favour the formation of large flocs, at room temperature and employing conditioning times from fractions of a minute up to some hours. The flocculation yield is generally dependent to a large degree on the concentration of the polymeric flocculating agent in the solution. Too high concentrations are detrimental. The optimal concentrations are generally from 10 to 100 parts per million even though concentrations of different values cannot be excluded.

The flocculating agents which are the object of the present invention are selective in the flocculation of ultrafine aqueous dispersions of titanium and iron ores. The gangue materials such as quartz are not flocculated. The simultaneous presence of minerals which can be separated by flocculation and of said gangue materials does not alter substantially the flocculation possibility of the minerals that can be flocculated. The flocculation of minerals that can be flocculated can be performed with very high yields, of about 100%.

The flocculating agents of the present invention can flocculate more specifically rutile, ilmenite, hematite, but other minerals cannot excluded.

As already mentioned above, flocculating agents are known that are selective for iron minerals, such as for instance the mineral taconite, but it is to be kept in mind that such flocculants are obtained from natural high molecular weight polymeric products and accordingly they are fully different from the flocculants which are the object of the present invention. On the contrary, selective, high or low molecular weight flocculants for titanium minerals are much less known.

In order to illustrate the present invention better and to make its employment easier, some illustrative examples are shown in the following, but said examples are not to be considered as limitative of the object and scope of the present invention.

The flocculating power in such examples is calculated by the relationship:

$$P_f = \frac{p_o - p}{p_o} \times 100$$

wherein $P_f$ is the flocculating power, $p_o$ is the weight of the mineral contained, in the absence of the flocculating agent, in the top part of the dispersion which is 70/100 of the total volume, and p is the weight of the mineral contained, in the presence of the flocculant and under the same conditions, in the same part of the dispersion. At p=0 the maximum value ($P_f$=100%) is obtained of the flocculating power. At $p > p_o$, $P_f$ assumes a negative value, which means that the polymer acts as a dispersing agent. In that case, the dispersing power ($P_d$) is calculated according to the relationship:

$$P_d = \frac{p - p_o}{p_p - p_o} \times 100$$

wherein $p_p$ corresponds to 70/100 of the weight of the mineral introduced into the dispersion. At $p=p_p$ the maximum dispersing power ($P_d=100\%$) is obtained.

EXAMPLE 1

Synthesis of a monomeric compound of the formula

A stirred mixture of 15.90 g pyrocatechol in 115 ml dichlorobenzene is treated with 22.84 g 3-chloropropanoic acid chloride at room temperature and dropwise for about 10 minutes, then the mixture is heated to 50° C. for about 30 minutes till complete homogenization, cooled again to room temperature, and treated portionwise in about 1 hour with 41.0 g AlCl3, and then heated to 110° C. for 3 hours. The mixture after cooling is hydrolyzed with 300 g of ice and 150 ml concentrated HCl, and the solid thus separated is filtered, taken with benzene at boiling and then let separate by crystallization. 8.00 g is obtained of crude 3,4-dihydroxyphenyl-2'-chloroethylketone with melting point 138°-140° C. The aqueous phase is filtered, and after extraction with ethyl ether, drying with anhydrous sodium sulfate and elimination of the solvent, it gives a further amount of 2.42 g of the product. The compound after purification by crystallization from a mixture of chloroform-methanol shows a melting point of 143.5° C.

8.10 g 3,4-dihydroxyphenyl-2'-chloroethylketone, 28 ml acetic anhydride and a drop of concentrated H2SO4 are stirred for 40 hours at room temperature and then poured into 400 ml water and stirred for a further period of 7 hours. The solid so formed, after filtering and drying with P2O5, gives 10.42 g 3,4-diacetoxyphenyl-2'-chloroethylketone with a melting point of 94°-97° C., which is employed with no further purification.

A solution of 11.38 g 3,4-diacetoxyphenyl-2'-chloroethylketone in 133 ml anhydrous benzene is treated dropwise for 12 minutes while stirring with 6.75 g triethylamine and then stirred at room temperature for 4.25 hours till the chloride reagent disappears, and afterwards the solution is hydrolyzed with 50 ml of 1:10 HCl. The aqueous phase is then separated and extracted with methylene chloride. The extracts are added to the organic phase and then washed with water till the mixture is neutral, then the mixture is dried with anhydrous sodium sulfate and the solvent is removed from the same. The resulting is extracted with petroleum ether with boiling point 40°-60° C. The extracts, after concentration by evaporation of the solvent, give 6.98 g of the monomeric 3,4-diacetoxyphenylvinylketone. The compound, after purification by crystallization from ethyl ether at −53° C., shows a melting point of 70°-72° C.

EXAMPLE 2

Synthesis of a monomeric compound of the formula:

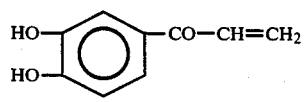

9.42 g 3,4-dihydroxyphenyl-2'-chloroethylketone, prepared according to Example 1, dissolved in 450 ml anhydrous ethyl ether, is treated at 0° C. with 12 ml triethylamine, then stirred at room temperature for 24 hours. The reaction mixture is hydrolyzed with 300 ml of 1:10 HCl and then extracted with ethyl ether. Residual waters after extraction are salted and extracted again. The ether phases are collected and dried with anhydrous sodium sulfate and, after removal of the solvent, they give 5.00 g of crude 3,4-dihydroxyphenylvinylketone which, after recrystallization from ethyl ether at a low temperature, shows a melting point of 114°-117° C.

EXAMPLE 3

Synthesis of a monomeric compound of the formula

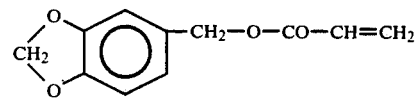

11.70 g piperonyl alcohol dissolved in 20 ml anhydrous toluene is treated with 4.5 g sodium carbonate and 0.32 g cuprous chloride, then the mixture is added while stirring in about 10 minutes with a solution of 7.66 g acryloyl chloride in 20 ml anhydrous toluene. The solid residue after about 5 hours reflux is filtered and washed with toluene, and the solution, after removal of the solvent, is distilled under low pressure. The fraction collected at 97°-100° C./0.01 Torr gives 11.62 g 3,4-methylendioxybenzylacrylatte whose purification is performed by low pressure distillation in the presence of tert-butylcatechol as a stabilizing agent.

EXAMPLE 4

Synthesis of a monomeric compound of the formula

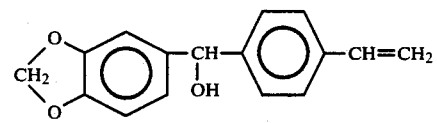

A solution of 8.308 g 4-chlorostyrene in 64 ml tetrahydrofuran is added dropwise and with stirring to 1.474 g of magnesium turnings and 11 ml anhydrous tetrahydrofuran in a nitrogen atmosphere, so as to give rise to the spontaneous reflux of the solvent. Next, after heating the mixture to reflux for 30 minutes and stirring at room temperature for 3 hours, said mixture is treated for 20 minutes with 7.16 g piperonylaldehyde dissolved in 30 ml anhydrous tetrahydrofuran, so that the mixture spontaneously keeps under slight reflux, then it is stirred at room temperature for 1.5 hours, hydrolyzed with 100 ml of a 10% aqueous solution of ammonium sulfate and extracted with ethyl ether. The extracts after washing with water till they are neutral are dried wih anhydrous sodium sulfate and freed from the solvent so as to give an oil which is subjected to chromatography on a 70-230 mesh Merck silica gel column with chloroform as the eluent. Said chromatography gives 12.03 g 3,4-methylenedioxyphenyl-4'-styrylcarbinol which after recrystallization from n-hexane shows a melting point of 55°-56° C.

EXAMPLE 5

Synthesis of a monomeric compound of the formula

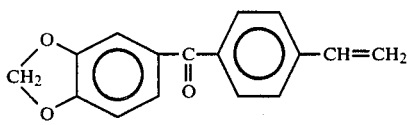

A mixture of 15.3 g pyridinchlorochromate, 50 ml anhydrous methylene chloride and 19 g of ground 4A molecular sieves is treated for 5 minutes with a solution of 12.0 g 3,4-methylenedioxyphenyl-4'-styrylcarbinol in 50 ml methylene chloride so that a slight reflux is maintained. After stirring for two hours at room temperature, the solid is filtered out by washing the same with methylene chloride and the solution, after concentration, is chromatographed on a Florisil column with methylene chloride as the eluent.

Said chromatography gives 8.95 g of solid 3,4-methylendioxyphenyl-4'-styrylketone. Said compound, after crystallization from ethyl ether at −40° C. shows a melting point of 83°-84° C.

EXAMPLE 6

Synthesis of a monomeric compound of the formula

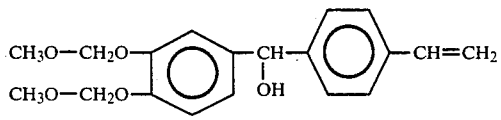

A solution of 9.89 g 3,4-di(methoxymethoxy)benzaldehyde in 50 ml anhydrous tetrahydrofurane is added to a solution of 4-styrylmagnesium chloride in tetrahydrofuran, prepared as disclosed in Example 4 starting from 1.474 g magnesium, under nitrogen atmosphere and with stirring. The mixture after stirring at room temperature for 2 hours is hydrolyzed with a 10% water solution of ammonium sulfate and then extracted with ethyl ether. The extracts, washed with water and dried with anhydrous sodium sulfate give after removal of the solvent 13.44 g of an oil consisting of 3,4-di(methoxymethoxy)phenyl-4'-styrylcarbinol which is chromatographed on a 230–400 mesh Merck silica gel column with chloroform as the eluent.

EXAMPLE 7

Synthesis of a monomeric compound of the formula

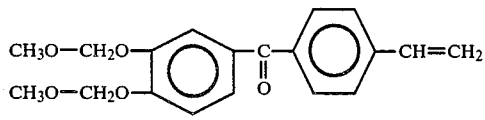

8.43 g of 3,4-di(methoxymethoxy)phenyl-4'-styrylcarbinol prepared according to Example 6 and dissolved in 50 ml of methylene chloride is oxidized similarly to the procedure disclosed in Example 5, by dropping the solution onto a mixture of 8.25 g pyridinechlorochromate, 50 ml methylene chloride and 1.00 g sodium acetate and keeping the mixture under stirring for two hours at room temperature. The reaction mixture is added with 500 ml of ethyl ether and filtered, then its volume is reduced and the mixture is subjected to chromatography over a Florisil column employing ethyl ether as the eluent. The ether fractions containing useful 3,4-di(methoxymethoxy)phenyl-4'-styrylketone are washed with 3% NaOH, then with water till they are neutral, and dried with anhydrous sodium sulfate, so that by removal of the solvent they give 7.96 g of a product which after further purification by column chromatography over 230–400 mesh Merck silica gel and employing as eluent a mixture of petroleum ether (boiling point 40°–60° C.)-ethyl acetate, is collected in the form of a slightly yellow clear oil (6.54 g).

EXAMPLE 8

Synthesis of a monomeric compound of the formula

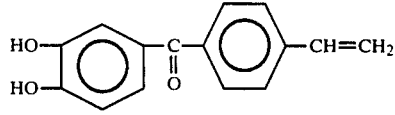

12.12 g of 3,4-di(methoxymethoxy)phenyl-4'-styrylketone prepared according to Example 7 is treated with a mixture of 200 ml ethanol and 200 ml of 1:10 HCl, heating to 100° C. for 15 minutes. The mixture containing the solid precipitate is extracted with ethyl ether for three times. The ether compounds, after drying with anhydrous sodium sulfate and removal of the solvent, give 8.80 g of 3,4-dihydroxyphenylstyrylketone which after recrystallization from benzene repeated two times shows a melting point of 157°–159° C.

EXAMPLE 9

Preparation of 3,4-methylenedioxybenzylacrylate/acrylic acid copolymers

A homogeneous mixture of 4 ml of peroxide-free dioxane, 5.124 g of acrylic acid, 1.639 g of 3,4-methylenedioxybenzylacrylate and 69 mg of AIBN is introduced into a vial previously dried in nitrogen atmosphere and bearing a tail-shape end, then the vial is flame-sealed and heated to 60° C. in a thermostat with stirring for 90 minutes. The vial contents are poured into benzene and the solid which is precipitated is filtered, dissolved in a little amount of dioxane and precipitated again in benzene. After further filtering and drying in the oven under vacuum at 30° C. overnight 5.193 g is obtained of the copolymer which is then subjected to fractionation by preparation of a 1% solution by weight of the same in dioxane and adding at a slow rate benzene dropwise to said solution while stirring and keeping the same at a constant temperature of 25° C. Three fractions are collected by filtration corresponding to a small amount of the top fraction, a useful center fraction and a large amount of a tail fraction. The center fraction of 2.86 g has an intrinsic viscosity in dioxane at 25° C. of 82.1 ml/g and an average molecular weight by osmometry of 35,000 dalton.

A copolymer of intrinsic viscosity in dioxane at 25° C. of 77.9 ml/g and average molecular weight by osmometry of 33,000 dalton is obtained similarly, with 70% yield, starting from the same monomeric compounds in the weight ratio of 1.59:1.

In a similar way, a copolymer with an intrinsic viscosity in dioxane at 25° C. of 76.3 ml/g and average molecular weight by osmometry of 33,000 dalton is prepared with 62% conversion starting from the same monomeric compounds in the weight ratio of 1:1.23 in the absence of the solvent.

EXAMPLE 10

Preparation of 3,4-methylenedioxybenzylacrylate/methacrylic acid polymers

The preparation and fractionation of the copolymers are carried out by the same way disclosed in Example 9, but the solvent employed for the fractionation procedure is methanol, and the non-solvent is methylene chloride.

6 ml of dioxane, 3.150 g of methacrylic acid and 8.124 g of 3,4-methylenedioxybenzylacrylate in the presence of 113 mg of AIBN give after 210 minutes an amount of 3.674 g of the copolymeric compound which, after fractionation, gives a central fraction of 2.226 g with an intrinsic viscosity in dioxane at 25° C. of 125.0 ml/g and with an average molecular weight by osmometry of 54,000 dalton.

A copolymer with intrinsic viscosity in methanol at 25° C. of 208.7 ml/g is obtained in a similar way and with 54% conversion starting from the same monomeric compounds in the weight ratio of 3.92:1.

EXAMPLE 11

Preparation of a 3,4-methylenedioxybenzylacrylate/4-vinylbenzoic acid copolymer A mixture of 17.505 g of 4-vinylbenzoic acid, 6.106 g of 3,4-methylenedioxybenzylacrylate, 14 ml of peroxide-free dioxane, and 238 mg of AIBN is copolymerized in a vial at 60° C. for 135 minutes according to the disclosure given in Example 9, so that 3.217 g of a copolymer is obtained which, after fractionation from a dioxane/benzene mixture, gives a central fraction of 2.189 g with intrinsic viscosity in dioxane at 25° C. of 17.6 ml/g and an average molecular weight by osmometry of 100,000 dalton.

EXAMPLE 12

Preparation of a 3,4-methylenedioxybenzylacrylate/4-vinylpyridine copolymer

A mixture of 7.027 g of 4-vinylpyridine, 4.162 g of 3,4-methylenedioxybenzylacrylate, 10 ml of peroxide-free dioxane and 112 mg of AIBN is copolymerized in a vial at 60° C for 280 minutes according to the way disclosed in Example 9 so that 2.718 g of a copolymer is obtained which, after fractionation from 1% solution in methylene chloride by slow addition of benzene at 25° C., gives a central fraction of 2.513 g with intrinsic viscosity in methylene chloride at 25° C. of 69.4 ml/g.

EXAMPLE 13

Preparation of 3,4-methylenedioxyphenyl-4'-styrylketone/acrylic acid copolymers A mixture of 4.054 g of 3,4-methylenedioxyphenyl-4'-styrylketone, 28 ml of peroxide-free dioxane, 4.625 g of acrylic acid and 11 mg of AIBN, after copolymerization at 60° C. for 750 minutes according to the disclosure given in Example 9 gives 2.670 g of a copolymeric compound which, after fractionation from a dioxane/benzene mixture at 25° C., gives a central fraction of 2.300 g with intrinsic viscosity in dioxane at 25° C. of 78.3 ml/g and average molecular weight by osmometry of 70,000 dalton.

In a similar way, a copolymer with intrinsic viscosity at 25° C. of 74.94 ml/g is prepared with 50% conversion starting from the same monomers in the weight ratio of 1:5.33.

EXAMPLE 4

Preparation of a 3,4-methylenedioxyphenyl-4'-styrylcarbinol/acrylic acid copolymer A mixture of 3.933 g of 3,4-methylenedioxyphenyl-4'-styrylcarbinol, 29 ml of peroxide-free dioxane, 4.518 g of acrylic acid and 9 mg of AIBN, after copolymerization at 60° C. for 1970 minutes according to the disclosure of the procedure of Example 9, gives 3.805 g of the copolymer which, after fractionation from a dioxane/benzene mixture at 25° C. gives a central fraction of 3.369 g with intrinsic viscosity in dioxane at 25° C. of 99.2 ml/g.

EXAMPLE 15

Preparation of a 3,4-diacetoxyphenylvinylketone/acrylic acid copolymer

A mixture of 2.471 g of 3,4-diacetoxyphenylvinylketone, 6 ml of peroxide-free dioxane, 2.872 g of acrylic acid and 21 mg of AIBN, after copolymerization at 60° C. for 340 minutes following the procedure disclosed in Example 9, gives 4.051 g of a copolymer which, after fractionation from a dioxane/benzene mixture at 25° C., gives a central fraction of 3.080 g with intrinsic viscosity in dioxane at 25° C. of 52.5 ml/g and average molecular weight by osmometry of 41,000 dalton.

EXAMPLE 16

Preparation of a 3,4-dihydroxyphenylvinylketone/acrylic acid copolymer 2.703 g of the 3,4-diacetoxyphenylvinylketone/acrylic acid copolymer with intrinsic viscosity in dioxane at 25° C. of 52.5 ml/g, as prepared according to the disclosure given in Example 15; and 100 ml of dioxane are treated with 1 ml of concentrated HCl in four portions during 7 hours with continuous stirring at 40°–45° C. The copolymeric compound so obtained, having unprotected phenolic hydroxyl groups, separates partly in the form of an oil while a part of the same can be recovered from the dioxane solution by evaporation of the solvent. The copolymer is dissolved in THF and then precipitated by pouring the solution at a slow rate into methylene chloride. After drying at 25° C. under vacuum its weight is of 2.451 g.

EXAMPLE 17

Preparation of a 3,4-dihydroxyphenylvinylketone/3,4-methylenedioxybenzylacrylate/acrylic acid terpolymeric compound A mixture of 1.308 g of 3,4-dihydroxyphenylvinylketone, 3.522 g of 3,4-methylenedioxybenzylacrylate, 32 ml of peroxide-free dioxane, 6.071 g of acrylic acid and 12 mg of AIBN, after copolymerization at 60° C. for 96 hours according to the procedure disclosed in Example 9, gives 2.979 g of a copolymer which, after fractionation from dioxane/benzene mixture at 25° C., gives a central fraction of 2.020 g with intrinsic viscosity in dioxane at 25° C. of 21.0 ml/g and average molecular weight by osmometry of 105,000 dalton.

EXAMPLE 18

Preparation of a 3,4-dihydroxyphenyl-4'-styrylketone/acrylic acid copolymer

A mixture of 5.380 g of 3,4-dihydroxyphenyl-4'-styrylketone, 55 ml of peroxide-free dioxane, 6.923 g of acrylic acid and 35 mg of tri(n-butyl)borane, after copolymerization at 27° C. for 27 hours according to the procedure disclosed in Example 9, gives 4.353 g of a copolymer which, after fractionation from a tetrahydrofuran/methylene chloride mixture at 25° C. gives a central fraction of 2.520 g with intrinsic viscosity in dioxane at 25° C. of 60.3 ml/g.

EXAMPLE 19

Preparation of a 3,4-dimethoxymethoxy-phenyl-4'-styrylketone/acrylic acid copolymer A mixture of 4.250 g of 3,4-dimethoxymethoxyphenyl-4'-styrylketone, 35 ml of peroxide-free dioxane, 3.890 g of acrylic acid and 3 mg of AIBN, after copolymerization at 60° C. for 22 hours according to the disclosure given in Example 9, gives 3.460 g of a copolymer which, after fractionation from a dioxane/benzene mixture at 25° C., gives a central fraction of 2.595 g with intrinsic viscosity in dioxane at 25° C. of 22.20 ml/g.

EXAMPLE 20

Dispersion processing of rutile with a 3,4-methylenedioxybenzylacrylate/acrylic acid copolymer Materials employed:
A copolymeric compound as disclosed in Example 9, with intrinsic viscosity of 82.1 ml/g in dioxane at 25° C.
Rutile with 98% purity and ground to sizes $\leq 20$ μm.
NaOH and HCl aqueous solutions.
Experiments were carried out as follows:
about 2 g of the ore and 70 ml of water in a 100 ml graduated cylinder, whose height that can usefully employed is 185 mm, are treated with the desired amount of the copolymer in water solution at pH 12, then the mixture is shaken for 5 minutes, then adjusted to the desired value of the pH, reset, then shaken again for 15 minutes and afterwards it is allowed to stand with the cylinder in the vertical position for 2'30" at pH=3.5; 20' at pH=7.5 and 20' at pH=9.5 (times are fixed on the basis of previous tests, because in the absence of the flocculating agent the weight of the ore contained in the upper volume of 70 ml of the liquid is to be of about 1 g, i.e. 50% of that employed in the experiment). The upper volume of 70 ml of the dispersion is then removed by a siphon and then evaporated to dryness till constant weight.

According to the equations for the determination of the flocculating or the dispersing power, the weight of the mineral contained in the upper 70 ml volume of the liquid in the presence of the copolymer corresponds to p; the weight of the mineral contained in the upper 70 ml volume of the liquid in the absence of the copolymer corresponds to $p_o$; the weight of the mineral contained in the lower 30 ml volume of the liquid in the absence of the solvent, added to the $p_o$ value and then multiplied by 0.7, corresponds to $pp_o$. The lower 30 ml volume of the dispersion is also evaporated to dryness till constant weight.

Flocs are formed at the final acid pH value, which flocs settle very easily.

When the concentration of the flocculating agent is of 10 parts per million (ppm), and with the final pH value pointed out above, results are: pH=3.5, $P_f=76$; pH=7.5, $P_d=59$; pH=9.5, $P_d=47$.

When the concentration of the flocculating agent is of 50 ppm, results are: pH=3.5, $P_f=89$; pH=7.5, $P_d=78$; pH=9.5, $p_d=77$.

When the concentration of the flocculating agent is of 100 ppm, results are: pH=3.5, $P_f=78$; pH=7.5, $P_d=85$; pH=9.5, $P_d=80$.

EXAMPLE 21

Dispersion processing of rutile with a 3,4-methylenedioxybenzylacrylate/acrylic acid copolymer The copolymeric compound was prepared as disclosed in Example 9, with intrinsic viscosity of 77.9 ml/g in dioxane at 25° C. Experiments were carried out as disclosed in Example 20.

When the concentration of the flocculating agent is of 10 ppm, results are: pH=3.5, $P_f=70$; pH=7.5, $P_f=53$; pH=9.5, $P_d=67$.

When the concentration of the flocculating agent is of 50 ppm, results are: pH=3.5, $P_f=91$; pH=7.5, $P_d=74$; pH=9.5, $P_d=87$.

When the concentration of the flocculating agent is of 100 ppm, results are: pH=3.5, $P_f=89$; pH=7.5, $P_f=7$; pH=9.5, $P_d=100$.

EXAMPLE 22

Dispersion processing of rutile with a 3,4-methylenedioxybenzylacrylate/acrylic acid copolymer The copolymer, with intrinsic viscosity in dioxane at 25° C. of 76.3 ml/g was spread according to Example 9.
Experiments were carried out according to Example 20.

When the concentration of the flocculating agent is of 10 ppm, results are: pH=3.5, $P_f=58$; pH=7.5, $P_f=1$; pH=9.5, $P_f=0$.

When the concentration of the flocculating agent is of 50 ppm, results are: pH=3.5, $P_f=85$; pH=7.5, $P_d=18$; pH=9.5, $P_d=20$.

When the concentration of the flocculating agent is of 100 ppm, results are: pH=3.5, $P_f=85$; pH=7.5, $P_d=74$; pH=9.5, $P_d=13$.

EXAMPLE 23

Flocculating processing of rutile with a 3,4-methylendioxybenzylacrylate/4-vinylbenzoic acid copolymer.

The copolymeric compound was prepared as disclosed in Example 11, with intrinsic viscosity of 17.6 ml/g in dioxane at 25° C. Experiments were carried out, as disclosed in Example 20.

When the concentration of the flocculating agent is of 10 ppm, results are: pH=3.5, $P_f=9$; pH=7.5, $P_d=67$; pH=9.5, $P_d=46$.

When the concentration of the flocculating agent is of 50 ppm, results are: ph=3.5, $P_f=54$; pH=7.5, $P_d=55$, pH=9.5, $P_d=70$.

When the concentration of the flocculating agent is of 100 ppm, results are: pH=3.5, $P_f=80$; pH=7.5, $P_d=74$; pH=9.5, $P_d=86$.

EXAMPLE 24

Dispersion processing of rutile with a 3,4-methylenedioxybenzylacrylate/A-vinylpyridine copolymer The copolymer with intrinsic viscosity in methylene chloride at 25° C. of 69.4 ml/g prepared as disclosed in Example 12.

Experiments were carried out according to Example 20, with the exception that the copolymeric compound is added as a water solution at pH=2.

When the concentration of the flocculating agent is of 50 ppm, results are: pH=3, $P_d=100$; pH=7, $P_f=41$; pH=9, $P_f=12$.

EXAMPLE 25

Dispersion processing of hematite with a 3,4-methylenedioxybenzylacrylate/acrylic acid copolymer The copolymer having intrinsic viscosity in dioxane at 25° C. of 77.9 ml/g was prepared according to Example 9.

Experiments were carried out according to Example 20.

When the concentration of the flocculating agent is of 10 ppm, results are: pH=3, $P_f=80$; pH=7, $P_f=65$; pH=9, $P_f=55$.

When the concentration of the flocculating agent is of 50 ppm, results are: pH=3, $P_f=98$; pH=7, $P_f=70$; pH=9, $P_f=18$.

When the concentration of the flocculating agent is of 100 ppm, results are: pH=3, $P_f=87$; pH=7, $P_d=82$; pH=9, $P_d=26$.

EXAMPLE 26

Dispersion processing of ilmenite with a 3,4-methylenedioxybenzylacrylate/acrylic acid copolymer The copolymer having intrinsic viscosity in dioxane at 25° C. of 77.9 ml/g was prepared according to Example 9.

Experiments were carried out according to Example 20.

When the concentration of the flocculating agent is of 10 ppm, results are: pH=3, $P_f=52$; pH=7, $P_f=64$; pH=9, $P_f=98$.

When the concentration of the flocculating agent is of 50 ppm, results are: pH=3, $P_f=52$; pH=7, $P_f=22$; pH=9, $P_d=11$.

When the concentration of the flocculating agent is of 100 ppm, results are: pH=3, $P_f=44$; pH=7, $P_f=2$; pH=9, $P_d=17$.

EXAMPLE 27

Dispersion processing of quartz with a 3,4-methylenedioxybenzylacrylate/acrylic acid copolymer A copolymer having intrinsic viscosity of 82.1 ml/g in dioxane at 25° C. was prepared as disclosed in Example 9.

Experimental tests were performed as disclosed in Example 20.

With copolymer concentration of 50 ppm, results were: pH=3, $P_d=43$; pH=7, $P_f=3$; pH=9, $P_d=13$.

EXAMPLE 28

Dispersion processing of rutile with a 3,4-methylenedioxybenzylacrylate/methacrylic acid copolymer A copolymer having intrinsic viscosity of 125.0 ml/g in dioxane at 25° C. was prepared as disclosed in Example 10.

Experimental tests were performed as disclosed in Example 20.

With a polymer concentration of 10 ppm, results were: pH=3.5, $P_d=33$; pH=7.5, $P_f=0$; pH=9.5, $P_d=3$.

With a polymer concentration of 50 ppm, results were: pH=3.5, $P_d=3$; pH=7.5, $P_d=29$; pH=9.5, $P_d=3$.

With a polymer concentration of 100 ppm, results were: pH=3.5, $P_d=18$; pH=7.5, $P_d=33$; pH=9.5, $P_d=20$.

EXAMPLE 29

Dispersion processing of rutile with a 3,4-dihydroxyphenylvinylketone/acrylic acid copolymer The copolymer was prepared according to the disclosure given in Example 16.

Experimental tests were carried out as disclosed in Example 20.

With a polymer concentration of 10 ppm, results were: pH=3, $P_d=59$; pH=7, $P_f=35$; pH=11, $P_d=20$.

With a polymer concentration of 50 ppm, results were: pH=3, $P_d=100$; pH=7, $P_d=72$; pH=11, $P_d=100$.

With a polymer concentration of 100 ppm, results were: pH=3, $P_d=100$; pH=7, $P_d=100$; pH=11, $P_d=100$.

EXAMPLE 30

Dispersion processing of ilmenite with a 3,4-dihydroxyphenylvinylketone/acrylic acid copolymer The copolymer was prepared as disclosed in Example 16.

Experimental tests were carried out according to the disclosure given in Example 20.

With a polymer concentration of 10 ppm, results were: pH=3, $P_f=58$; pH=7, $P_d=18$; pH=9, $P_d=15$.

With a polymer concentration of 50 ppm, results were: pH=3, $P_f=79$; pH=7, $P_d=6$; pH=9, $P_d=34$.

With a polymer concentration of 100 ppm, results were: pH=3, $P_f=58$; pH=7, $P_f=6$; pH=9, $P_d=45$.

EXAMPLE 31

Dispersion processing of rutile with a 3,4-methylenedioxyphenyl-4'-styrylcarbinol/acrylic acid copolymer A copolymer having intrinsic viscosity of 99.2 ml/g in dioxane at 25° C. was prepared according to the disclosure given in Example 14.

Experimental tests were performed as disclosed in Example 20.

With a polymer concentration of 10 ppm, results were: pH=3, $p_d=63$; pH=7, $P_d=74$; pH=9, $P_d=98$.

With a polymer concentration of 50 ppm, results were: pH=3, $P_d=2$; pH=7, $P_d=76$; pH=9, $P_f=11$.

With a polymer concentration of 100 ppm, results were: pH=3, $P_d=2$; pH=7, $P_d=75$; pH=9, $P_d=78$.

EXAMPLE 32

Dispersion processing of ilmenite with a 3,4-methylenedioxyphenyl-4'-styrylcarbinol/acrylic acid copolymer A copolymer having intrinsic viscosity of 99.2 ml/g in dioxane at 25° C. was prepared according to the disclosure given in Example 14.

Experimental tests were carried out as disclosed in Example 20.

With a polymer concentration of 10 ppm results were: pH=3, $P_f=58$; pH=7, $P_f=1$; pH=9, $P_d=21$.

With a polymer concentration of 50 ppm, results were: pH=3, $P_f=64$; pH=7, $P_f=15$; pH=9, $P_d=32$.

With a polymer concentration of 100 ppm, results were: pH=3, $P_d=5$; pH=7, $P_f=10$; pH=9, $P_d=30$.

EXAMPLE 33

Dispersion processing of ilmenite with a 3,4-methylenedioxybenzylacrylate/methacrylic acid copolymer A copolymer having intrinsic viscosity of 208.7 ml/g in methanol at 25° C. was prepared as disclosed in Example 10.

Experimental tests were carried out according to the disclosure given in Example 20.

With a polymer concentration of 10 ppm, results were: pH=3, $P_f=76$; pH=7, $P_f=86$; pH=9, $P_d=21$.

With a polymer concentration of 50 ppm, results were: pH=3, $P_d=4$; pH=7, $P_d=28$; pH=9, $P_d=83$.

With a polymer concentration of 100 ppm, results were: pH=3, $P_d=12$; pH=7, $P_d=32$; pH=9, $P_d=44$.

The present invention has been disclosed herein with particular reference to some specific embodiments of the same but it is to be understood that modifications and changes can be introduced in the present invention without departing from its spirit and scope for which a priority right is claimed.

We claim:

1. Selective flocculating agents for titanium and iron ores, said agents consisting of polymers and copolymers containing, as their monomeric units, the monomers corresponding to the following formula I:

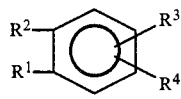

wherein $R^1$ and $R^2$ which are the same or different from each other, represent a bridging group of the formula $-O-CHR^5-O-$, or they are hydroxyl groups which can also be in the form of their ether or ester derivatives, and in which formula one of the symbols $R^3$, $R^4$ or $R^5$ corresponds to an atomic group containing, at a position variably spaced from the substitution site, a polymerizable functional group wherein $R^3$ and $R^4$ are other than the acyl radical of acrylic or methacrylic acid, whereas the other ones, which can be the same or different from each other, and being selected from the group consisting of hydrogen atoms, alkyl groups, aryl groups, hydroxyl groups, alkoxy groups, hydroxyalkyl groups, alkoxyalkyl groups, haloalkyl groups, carbonyl groups, carboxyl groups, ester groups, amido groups, nitro groups, sulfonic groups, halogen atoms, and nitrilo groups.

2. Selective flocculating agents according to claim 1, for titanium and iron ores, characterized in that said polymerizable group is an olefinic unsaturated group capable of free radical polymerization.

3. Selective flocculating agents according to claim 2, wherein said copolymers are made up of monomeric units corresponding to the monomers of the formula I, and of olefinic monomers containing groups whose hydrophilic character changes with the pH value.

4. Selective flocculating agents according to claim 3, for the flocculation of titanium and iron ores, wherein said olefinic monomers compounds belong to the class consisting of: acrylic acid, methacrylic acid, 4-vinylbenzoic acid, and 4-vinylpyridine.

5. Selective flocculating agents according to claim 4 for the flocculation of titanium and iron ores, characterized in that the molecular weight of said flocculating agents is up to one million for not cross-linked materials.

6. Selective flocculating agents according to claim 4, said agents being characterized in that the copolymers include two or more components and said copolymers contain an amount from 10% up to 30% of said monomeric compounds of the formula I.

7. Selective flocculating agents according to claim 1 for the flocculation of titanium and iron ores, characterized in that the molecular weight of said flocculating agents is up to one million for not cross-linked materials.

8. Selective flocculating agents according to claim 1 said agents being characterized in that the copolymers include two or more components and said copolymers contain an amount from 10 up to 30% of said monomeric compounds of the formula I.

9. The flocculating agents of claim 1 wherein said monomers include a monomer selected from the group consisting of:

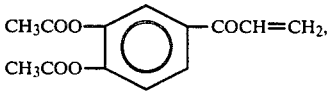

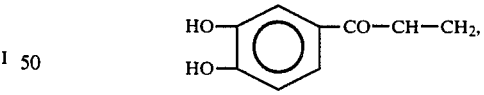

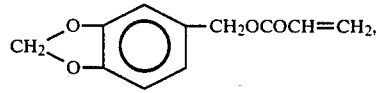

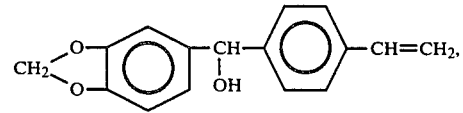

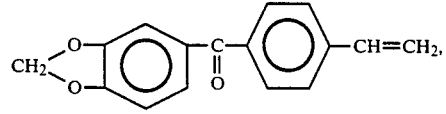

-continued
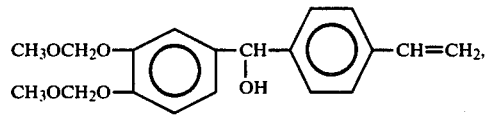
-continued
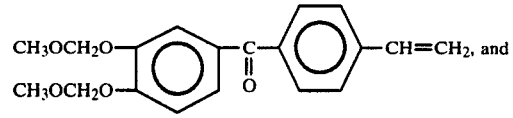
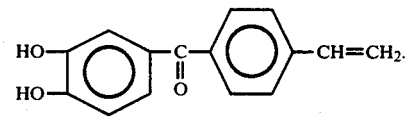
* * * * *